United States Patent
Agarwal et al.

[19]

[11] Patent Number: 5,958,010
[45] Date of Patent: *Sep. 28, 1999

[54] SYSTEMS AND METHODS FOR MONITORING DISTRIBUTED APPLICATIONS INCLUDING AN INTERFACE RUNNING IN AN OPERATING SYSTEM KERNEL

[75] Inventors: Neeraj Agarwal, Nashua, N.H.; Pierre Perret, Glendale, Ariz.; Michael G. McMenemy, Merrimack, N.H.

[73] Assignee: FirstSense Software, Inc., Burlington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/821,698

[22] Filed: Mar. 20, 1997

[51] Int. Cl.$^6$ ........................................ G06F 11/30
[52] U.S. Cl. .......................... 709/224; 709/223; 709/250; 395/184.01
[58] Field of Search .................. 395/200.54, 183.15, 395/184.01; 709/224, 201, 223, 250

[56] References Cited

U.S. PATENT DOCUMENTS

| | | | |
|---|---|---|---|
| 5,101,402 | 3/1992 | Chiu et al. | 709/224 |
| 5,568,471 | 10/1996 | Hershey et al. | 370/245 |
| 5,648,965 | 7/1997 | Thadani et al. | 370/241 |

FOREIGN PATENT DOCUMENTS 0 462 691 A2   4/1991   European Pat. Off. .

OTHER PUBLICATIONS

Hunt, Ray, "SNMP, SNMPv2 and CMIP—the technologies for multivendor network management", *Computer Communications* 20 (1997) pp. 73–88.

W. Richard Stevens, *Unix Network Programming*, Prentice Hall Software Series, pp. 173–177, 181–183, 186, and 374–386. (1990).

Friedrich et al. "Integration of Performance Measurement and Modeling for Open Distributed Processing", in ODP (Experiences with distibuted enviroments), Proceedings of the 3rd IFIP TC 6/WG 6.1 International Conference on ODP, Published by Chapman & Hall, 1994.

*Primary Examiner*—Frank J. Asta
*Assistant Examiner*—Jason D. Cardone
*Attorney, Agent, or Firm*—Foley, Hoag & Eliot, LLP

[57] ABSTRACT

Systems and methods for automated monitoring and management of distributed applications, client/server databases, networks and systems across heterogeneous environment The invention employs distributed, automated intelligent monitoring agents with embedded sensing technology which is knowledgeable of application protocols, to monitor continuously the network environment in real time. To this end, the monitoring agent can be located on each client and server in the network. The monitoring agent can couple to the communications stack for monitoring the data that is being passed between the client and the network, of a server in the network. The data can be collected and employed for trouble shooting trend analysis, resource planning, security auditing, accounting and chargeback, as well as other applications.

17 Claims, 5 Drawing Sheets

SYSTEMS AND METHODS FOR MONITORING DISTRIBUTED APPLICATIONS INCLUDING AN INTERFACE RUNNING IN AN OPERATING SYSTEM KERNEL

FIELD OF THE INVENTION

The invention relates to systems and methods for monitoring and managing distributed computing environments, and more particularly, to systems and methods for monitoring enterprise wide operation of a distributed computing system to develop business transaction level management data for system performance, usage trends, security auditing, capacity planning, and exceptions.

BACKGROUND OF THE INVENTION

A distributed computing architecture provides physical and logical distribution computing functions across many computers connected by a network system. Typically, the client initiates a service request to a server across the network. The server responds to the client's request by performing one or more database, file, printing, or other services. During the operation, the client and the server exchange data and individually perform data processing functions necessary for completing the operation. Complexity can arise because a single server can service multiple clients simultaneously, while a client can concurrently access the services of multiple servers. Moreover, servers can act as clients to other servers. Accordingly, distributed computer systems can have complex multi-tier distributed architectures.

Despite its complexity, distributed computing architectures have been remarkably successful in providing users with sophisticated and powerful systems for efficiently processing large amounts of data and providing rapid digital communication between multiple stations. The power of these systems has lead to the wide-spread proliferation of distributed computing architectures and has further resulted in the development of a plethora of distributed computing services such as client/server databases, distributed applications and networks across heterogeneous environments. Moreover, new technologies continue to fuel the growth of distributed systems. For example, the development of internet and intranet systems suitable for the commercial environment has created a burst of growth in the distributed computing field.

Although distributed computing architectures provide users with efficient and powerful tools, the complexity and sophistication of the architecture makes the implementation, deployment, and operation of the actual systems quite difficult. For example, a typical relational client/server database system will include a database server for providing a number of database services to a plurality of clients. The distributed architecture requires that each client is capable of properly communicating with the server, and that the server is capable of coordinating the multiple service requests received from the clients and maintaining data coherency for a data repository that could be distributed among several network memory devices. Loading such a system onto a computer network is a difficult task, made complex because electronic communications occurring between clients elements and servers occurs asynchronously, intermittently and quite rapidly. Accordingly, complex diagnostic and management tools are required to implement these distributed systems and to analyze and improve performance.

The complexity of a distributed computing architecture makes diagnosing system failures a difficult task. The asynchronous and rapid nature of communications between the distributed network components complicates the task significantly. Accordingly, a diagnostic technician has a difficult time in monitoring system operation in order to detect the events which cause system failure.

Responsive to this need for diagnostic and development tools, computer engineers have developed network monitoring systems which couple into the communication channels of the network to monitor transactions between clients and servers. These systems are often hardware devices that couple into the physical layer of the network system to monitor communications. Accordingly, this requires that each physical connection between a client and a server include an interconnected hardware device. These devices monitor the data transactions that occur. By generating records of these data transactions, a system technician can attempt to identify the events which lead to the system failure.

Although these systems work, they require that the hardware devices are capable of detecting and recording each data transaction that occurs between the client and the server. This requires that the hardware device read each packet of data being transferred across the network to determine if the data being sent is associated with the client or the server being monitored. However, the asynchronous and rapid nature of the data transactions that occur between clients and servers renders these devices susceptible to error for failure to detect every transaction that occurs. The technician may have only a partial record of the transactions which occurred between the client and the server, and therefore, an incomplete record that is unreliable for purposes of determining the cause of the system failure.

Other management tools exist that map a centralized system management model onto a distributed environment by implementing an agent-console architecture. In this architecture, agents continuously poll the servers and log files for the system, the network, or the applications to collect usage data and to determine if any "exception" has occurred. The console is a central management station through which the command and control functions are implemented. This architecture has several shortcomings. First, the continuous polling function employs valuable resources and degrades server performance. This is particularly true for metrics that require fine grain analysis of system activity and require constant polling. Second, the agents are at the server component level. Thus, usage, performance and exception statistics are only available at the component level and no measure is provided for end-to-end resource utilization, and no measure of the other participating components is made.

An alternative approach proposed by certain framework vendors has included an application program interface (API) to a set of resources that management tools can employ to monitor system performance. This approach requires that existing distributed applications operating on the system be edited and re-compiled to include API calls to the various system monitoring resources. Accordingly, this is a highly intrusive approach to system monitoring that is dependent upon the cooperation of every vendor providing an application program running on the distributed system.

SUMMARY OF THE INVENTION

Accordingly, it is an object of the invention to provide improved systems for monitoring distributed computer systems.

It is a further object of the invention to provide monitoring systems that yield business transaction level data.

It is a yet a further object of the invention to provide less intrusive monitoring systems that are readily scaled.

It is still a further object of the invention to provide distributed system management tools that characterize resource consumption at a business transaction level and take into account system, network, server and other component activities performed in furtherance of a business transaction.

The invention features systems and methods for automated monitoring and management of distributed applications, client/server databases, networks and systems, including those that operate across heterogeneous environments The invention employs distributed, automated, intelligent monitoring agents with embedded sensing technology knowledgeable of application protocols to continuously monitor the network environment in real time. The monitoring agents can be located on each client and server in the network. The monitoring agent couples to the network communications stack and monitors the data that is being passed between the client and the network, and between the server and the network. By coupling into the communications stack, the agent can monitor all data being passed to any process running on the client. Optionally, the agents can be directed to monitor communications with a selected group of servers, such that all data being passed from or to these servers will be detected and stored by the agent. The agent can store all the collected data in a database. As the agents are aware of the application protocols, the systems are capable of collecting useful data for trouble-shooting, trend analysis, resource planning, security auditing, accounting and chargeback, and other applications.

In one embodiment, the invention features a system for monitoring a server program operating in a network. The system can include a client (e.g. a computer workstation or a server) that has a communication stack for passing data between the network and the client. The system further includes a monitor that has an interface for coupling into the communications stack and for monitoring the data being passed between the client and the network, and a filter module for processing the data to detect portions of that data which is representative of communications associated with that server program. The system can further include a data memory for storing the detected portions of data.

The system can also include an agent for coupling into the data memory and for processing the detected portions of data to generate information representative of an operation of the server program. A user module can operate to receive information from the agent and process the information to determine the characteristic of the server program operation. The characteristic can be representative of a volume of use for the server program and response time or other characteristics.

The system also can include error detectors that monitor the information being passed between a server and a client to detect the occurrence of exceptions. The system can include an audit processor for auditing the transactions that occur between the server program and the client, and a security processor for processing the information to identify a security characteristic which is represented of a level of security for selected transaction. The security processor can also provide for security auditing, such that the data being transmitted on the network can be monitored for performing a security audit.

The system can further comprise a control module for providing a list of a plurality of server programs and for generating a plurality of the filter modules, each one of which can be associated with a respective one of the plurality of server programs. The system can also include a console module for providing control over operation of the monitor. The console module can couple to a plurality of the agent modules, wherein each of the agent modules can couple to the data memories associated with a particular node. In this way, the console modules can receive data about the operations of any node on the network. Optionally, the console module can connect to a database memory device for storing the data being collected. The data can be made available to an operator for modifying or repairing the distributed computing system.

In a further embodiment, the invention features a system for monitoring operation of a server program executing on a server connected to a network. The system includes a plurality of clients, each capable of requesting service of the server program and having a communication stack for exchanging data with the network. Each client can operate as a background process having a monitor program that includes an interface for coupling into the communication stack and for monitoring the data being passed between the client and the network, and a filter module that processes the data to detect portions of that data that is representative of communications associated with the server program. A data memory storing the detected portions of data can be included in the system.

In a further embodiment, the system monitors loop back operations. Loop back occurs when the server and a distributed application are located on the same client. Loop back information passes between the server and the application via the communication stack without ever going out onto the network. Because the monitor is coupled into the communications stack associated with the client, it can monitor the loop back data that only passes through the communications stack.

In another aspect, the invention features methods for monitoring a server program operating on a network. These methods can comprise the steps of: providing a client having a communication stack for passing data between the network and the client; monitoring the data being passed between the client and the network via a monitor having an interface for coupling into the communication stack; filtering the monitored data to detect portions of the data which are representative of communications associated with the server program; and storing the detected portions of data in a data memory. Methods according to this invention can comprise of further steps of coupling to the data memory via an agent, and processing the detected portions of data to generate information representative of an operation of the server program. Additionally, these methods can comprise the step of processing the information to determine a characteristic of the server program operation.

BRIEF DESCRIPTION OF THE DRAWINGS

The objects, features and advantages of the present invention will become more apparent from the following detailed description of exemplary embodiments thereof, taken in conjunction with the accompanying drawings, in which.

DETAILED DESCRIPTION

Figure 1:
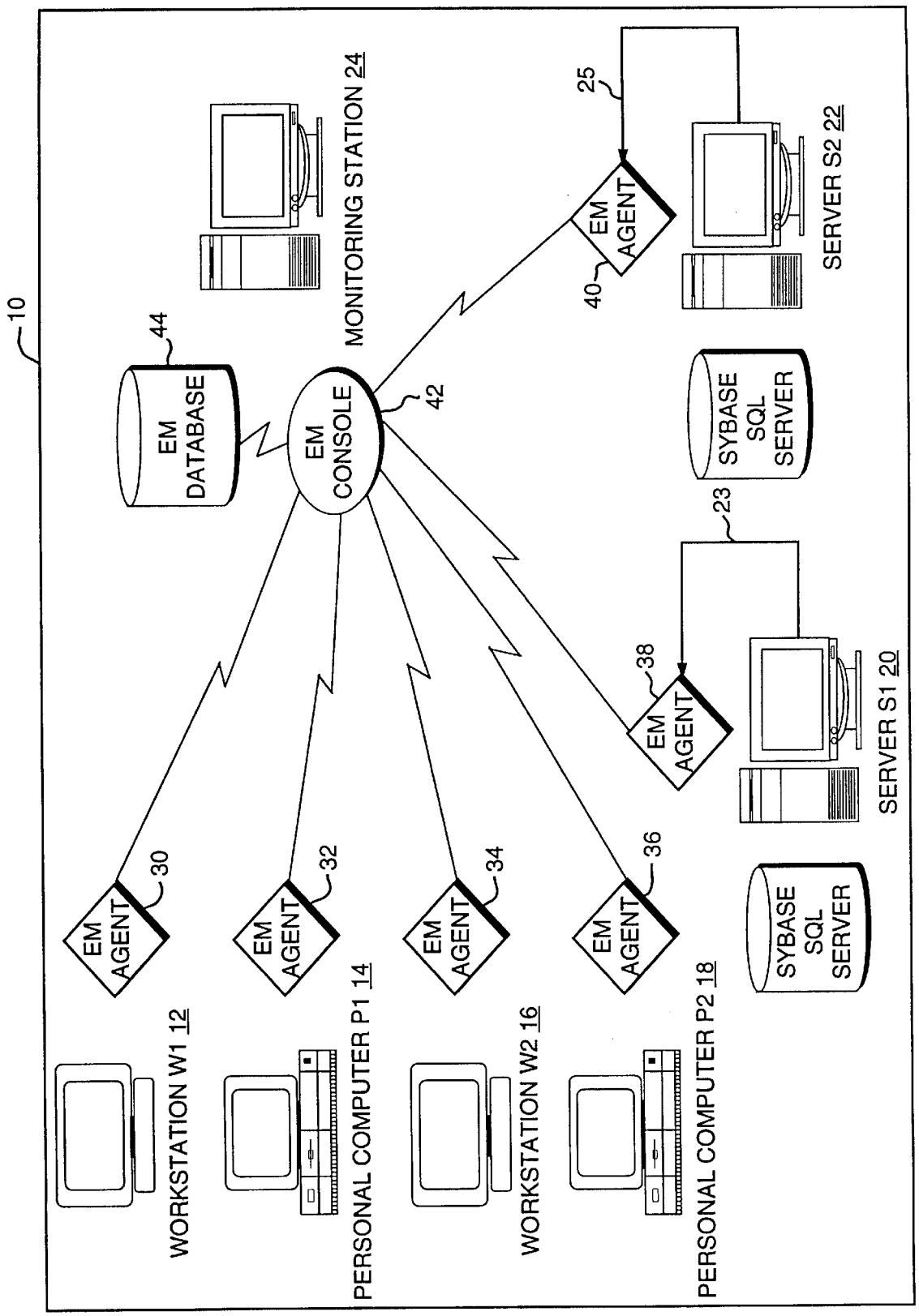
FIG. 1 depicts one system according to the invention for providing automated monitoring and management of distributed applications.

FIG. 1 illustrates a system 10 according to the invention for monitoring and managing a distributed application that includes multiple workstations, and servers. It will be understood that the system 10 can further include network devices such as printers and network memory devices, which are not shown in the drawing. In particular, FIG. 1 depicts workstations 12, 14, 16, and 18, server 20, server 22, Mission Universal Monitor (MUM) agents 30–40, MUM console module 42, MUM database 44, and monitoring station 24.

In the system 10, illustrated in FIG. 1, each of the workstations 12–18 is representative of a computer system coupled to a network suitable for carrying computer readable information. Each of the network nodes can communicate with either of the servers, 20 or 22 and request services therefrom. Accordingly, the system depicted in FIG. 1 has a distributed computing architecture that represents physical and logical distribution of computing functions across the different workstations, devices and servers.

FIG. 1 provides a general overview of the structure and operation of systems according to the invention that monitor this distributed processing environment. The system 10 includes the MUM agents 30–40 and the MUM console 42 with the interconnected MUM database 44. Each of the MUM agents 30–40 is associated with the respective one of the workstations or server elements. Moreover, a monitoring agent is associated with each component of the network to provide for enterprise wide monitoring, as all the processes, including those that are distributed, on the clients and the servers can be monitored. Each MUM agent can physically reside on its associated workstations or server to monitor, inter alia, the data that is being exchanged between a program operating on the workstation and a selected one or more of the servers 20 or 22.

Consequently, the processing of every device on the network can be monitored, and each of the depicted agents 30–40 can couple to the MUM console module 42 to pass information representative of the collected data to the MUM console 42. The MUM console 42 can store this information within the central database 44 for analysis by an operator (e.g., a system technician or system administrator). Alternatively, the agents can provide information directly to the MUM database. An application program running on the console 42, or any other system, can view the collected data to show at the component level and at the enterprise level, system performance of any process or component of the enterprise. Moreover, the system administrator can develop enterprise level usage statistics and response times, develop charts and reports and perform any other relevant data analysis for determining user-defined statistics relevant to the operation of the enterprise.

Accordingly, it is the function of the MUM agents 30–40 to collect data. To this end, each of the depicted MUM agents 30–40 can be an intelligent monitoring agent that is located on the managed nodes in the enterprise, wherein any node having an agent is deemed to be a managed node. In the system 10 depicted in FIG. 1, each of the nodes on the enterprise has a respective MUM agent, however, it should be apparent to one of ordinary skill in the art of computer engineering, that the number of MUM agents deployed across the enterprise is variable and can be selected according to the character of the application. The MUM agents can be software modules, such as C++ generated computer programs, that execute on the depicted workstations and servers to configure the servers, workstations and network into systems according to the invention. However, it will be apparent to those of ordinary skill in the art that the MUM agents can be hardware devices, such as electronic circuit card assemblies coupled into the backplane of the individual managed nodes, that monitor operations of the local system, or can be a combination of hardware and software devices. Any of these embodiments can be practiced with the present invention without departing from the scope thereof.

Each of the MUM agents 30–40 can operate autonomously to monitor multiple components including local processor performance, local processor resources, local processor configuration, the operation of the distributed application, the operation of the network, the operation of the various network devices including disks, file systems devices and tape, and other such information. Accordingly, it is a realization of the invention that diagnostic analysis can employ more than a measure of server CPU performance. Each of the monitoring agents 30–40 can be a single, multi-threaded process that can contain information to avoid constant polling by the enterprise monitor console 42. Each of the agents can continuously monitor in real time business transactions, databases, systems and networks detecting and correlating events, initiating corrective actions, and providing event notifications. The MUM agents are capable of understanding business transactions and can collect details of events, resource usage and response times and can pass this information to the MUM console 42 and store it in the MUM database 44.

Each of the agents 30–40 can also monitor loop back operations. As shown, loop back 23, 25 occurs when a server and a distributed application are located on the same client. Loop back information passes between the server and the application via the communication stack without ever going out onto the network. Because each agent 38, 40 is coupled into the client communications stack, it can monitor the loop back data that passes only through the communications stack.

Figure 2:
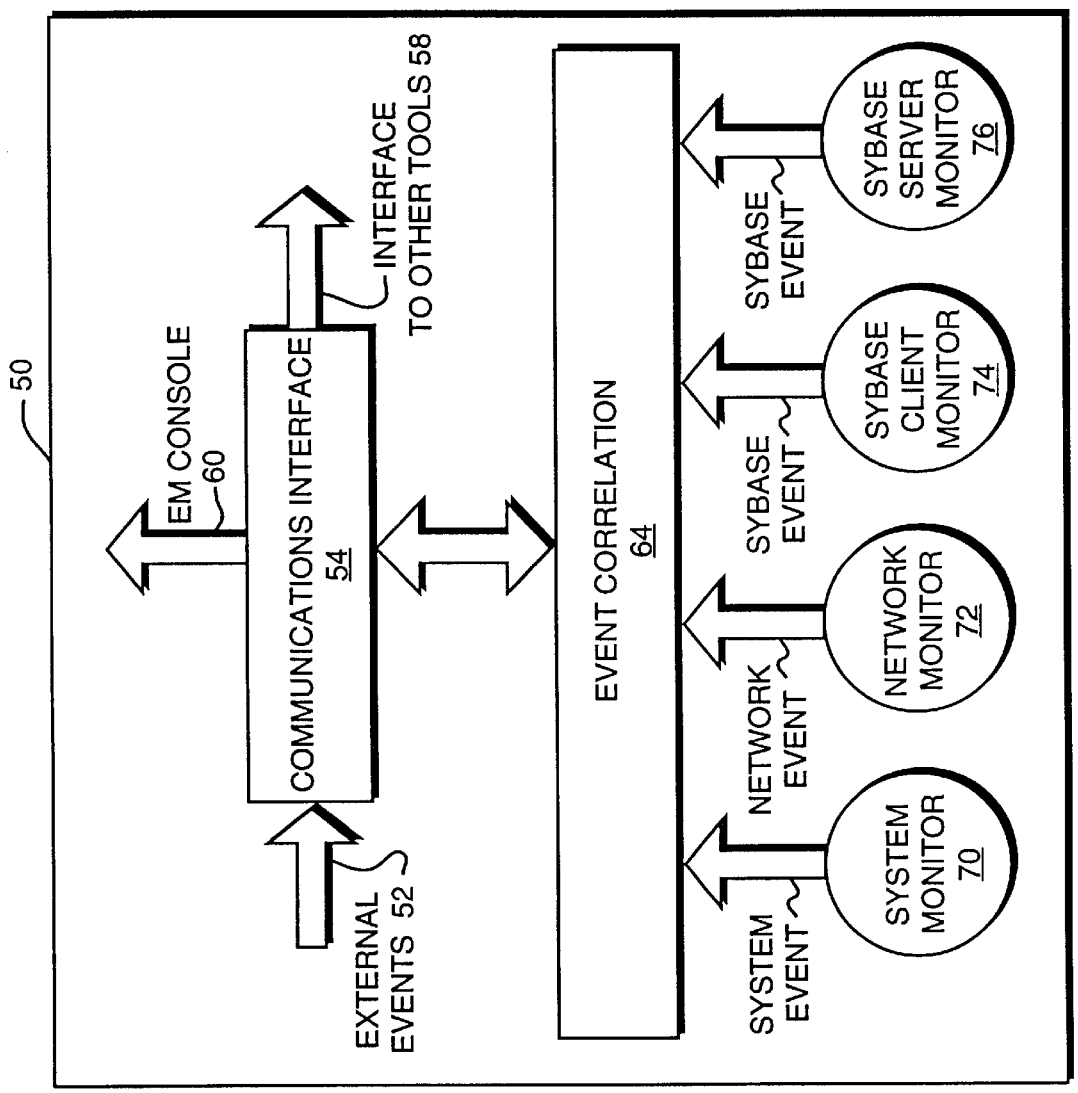
FIG. 2 is a functional block diagram of a monitoring agent suitable for practice with a system depicted in FIG. 1.

FIG. 2 depicts in functional block diagram form the architecture of one MUM agent 50 suitable for use with the system 10 depicted in FIG. 1. The agent 50 can be a software module that executes as a background process on the managed node. In particular, the agent 50 can be an agent residing on a network node that is capable of acting as a SYBASE™ client. The agent 50 includes an external event interface 52, a communications interface 54, a tools interface 58, and MUM console interface 60, and event correlation processor 64, a system monitor 70, a network monitor 72, a SYBASE™ client monitor 74, and a SYBASE™ server monitor 76.

The overall architecture of the agent 50 shows that the agent includes a set of monitor elements 70–76 and an external events interface 52 that provide event information about various components of the enterprise to the correlation processor 64. The correlation processor 64 correlates the events to generate data that can be passed to the MUM console 42, or passed to other tools, including other management tools or instrumentation code for setting off alarms, activating a beeper, sending a fax via modem, sending e-mail to system administrators or taking corrective action. Accordingly, the agent 50 collects details of events and processes these details in the correlation processor 64 to generate information representative, among other things, of business transactions.

To this end the external events interface 52 and the monitor elements 70–76 can collect details about events.

The external events interface 52 can be comprised of a set of program modules operating on the local system for detecting certain events. These external events can be Simple Network Management Protocol (SNMP) traps from other devices, events from user and system processes.

The monitor elements 70–76 can include code modules that operate on the node for collecting information about certain events and can also include a programming interface for receiving calls from those code modules to pass the notification of the detected event on to the monitor elements. The monitor elements 70–76 can receive event notifications from code that is monitoring any of the enterprise components relevant to the local system, which for the agent 50, can include system events, network events, and SYBASE client/server events. The programming interface of the monitor elements 70–76 can be an exported C++ based API that receives calls from this code upon detection of certain events. For example, the node can be running code for trapping the general protection fault, which can be defined as a system event. The code will make an API call to the agent 50 to notify the system monitor element 70 of the detected failure, and the system monitor element 70 can pass notification to the correlation processor 64. The API can encapsulate the code's service protocol to remove the operating characteristics of the code from the operation of the other agent components. This allows the detection code to act as plug-in modules that the user can select for configuring which events are to be monitored. Moreover, the user can define events of interest, for monitoring by the agent. Any code suitable for passing event details to any of the monitor elements within the agent 50 can be practiced with the present invention, without departing from the scope thereof.

In particular, the system monitor 70 can collect information about the operation of the local system. To this end, the system monitor 70 can include code modules for collecting information regarding processor load, memory usage, available memory space, and other similar information that is descriptive of the operation of the local workstation or server. The development of such code is well known in the art, and any suitable code can be practiced with the invention without departing from the scope thereof. Also, each agent can take action on the local system such as setting off alarms, activating a beeper, sending a fax via modem, sending e-mail to system administrators or taking corrective action.

In contrast to the system monitor 70, the monitors 72–76 are to monitor events associated with distributed processes. Accordingly, the details relevant to the monitored events require information about the distributed processing operations that are occurring. A realization of the present invention is that the monitors 72–76 can passively collect information about the distributed process by monitoring the network communications that occur during the distributed process. To this end, each monitor element can include an interface to the network communications stack to passively monitor communications between the distributed process elements.

Figure 3:
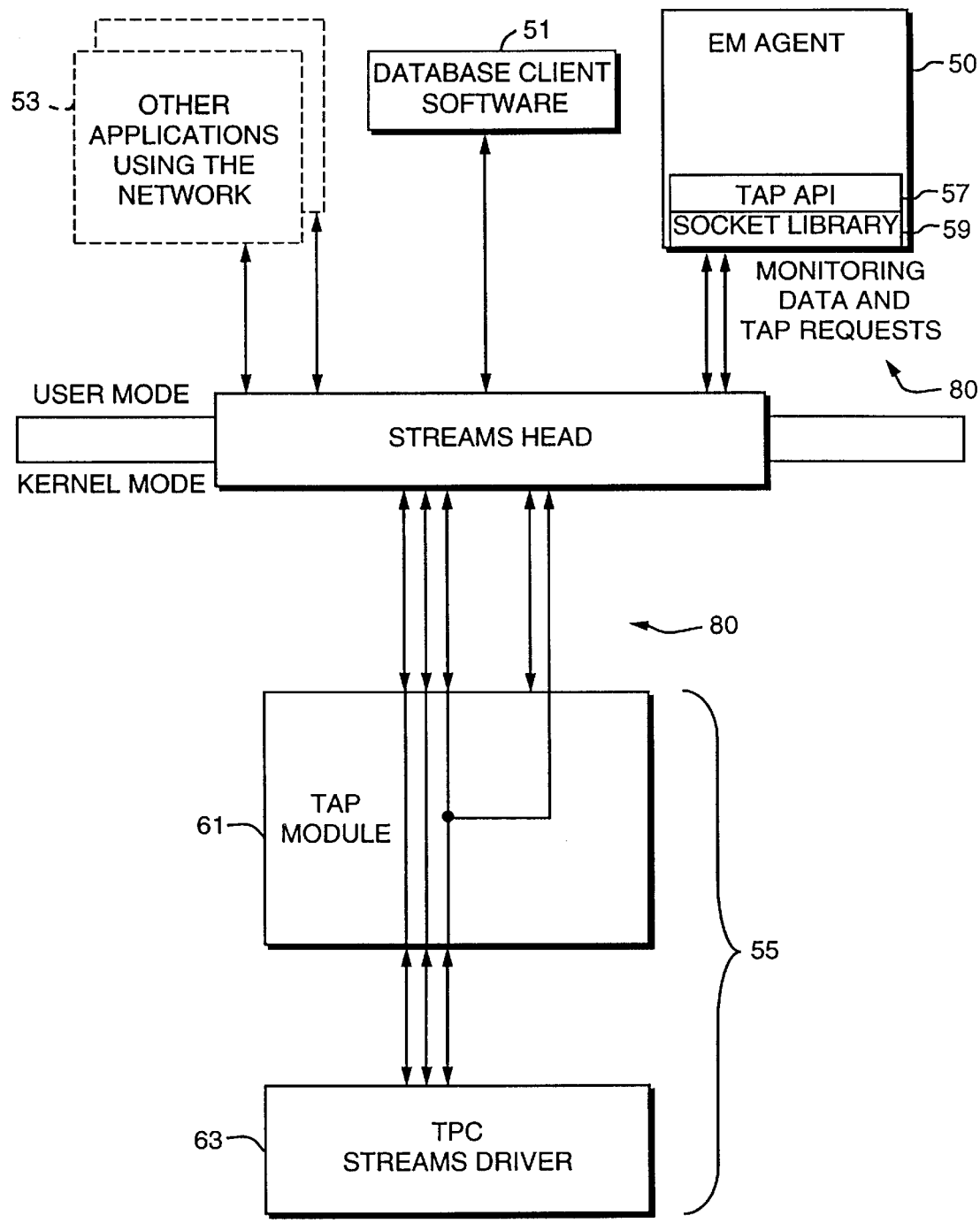
FIG. 3 depicts one example of a module for collecting details of a distributed process.

FIG. 3 depicts one example of a module 80 for collecting details of a distributed process, and suitable for use on a SUN SOLARIS™ platform. The module 80 monitors the network communications between database software 51 disposed on the local client and a selected group of servers and pass copies of the communications to the agent 50 for processing and for determining which events, if any, have occurred. In particular, the module 80 can enable monitoring by the agent 50 of the local client's database software 51 (e.g., SYBASE, CORBA, ORACLE) or other distributed process applications 53 having traffic that passes through the TCP stack of the managed node.

The module 80 is comprised of an agent 50 and STREAMS modules 55. The agent 50 includes a TAP API 57 and a socket library 59. The STREAMS modules 55, which include a TAP module 61 and a TCP STREAMS driver 63, can be constructed according to well known principles in the art of computer engineering, including those set forth in text Unix Network Programming, by W. Richard Stevens. The STREAMS module 55 may execute in kernel mode, as shown in FIG. 3. The TAP module 61 autopushes on top of the TCP STREAMS stack 65 so that all TCP traffic in and out of the managed node passes through the module 80. The module 80 is aware of the communications protocol for the distributed process or processes being monitored, such as ORACLE or SYBASE. In this way, the module 80 can filter from the traffic those portions that are relevant to the agent 50 and pass copies of this traffic to the agent 50.

Figure 4:
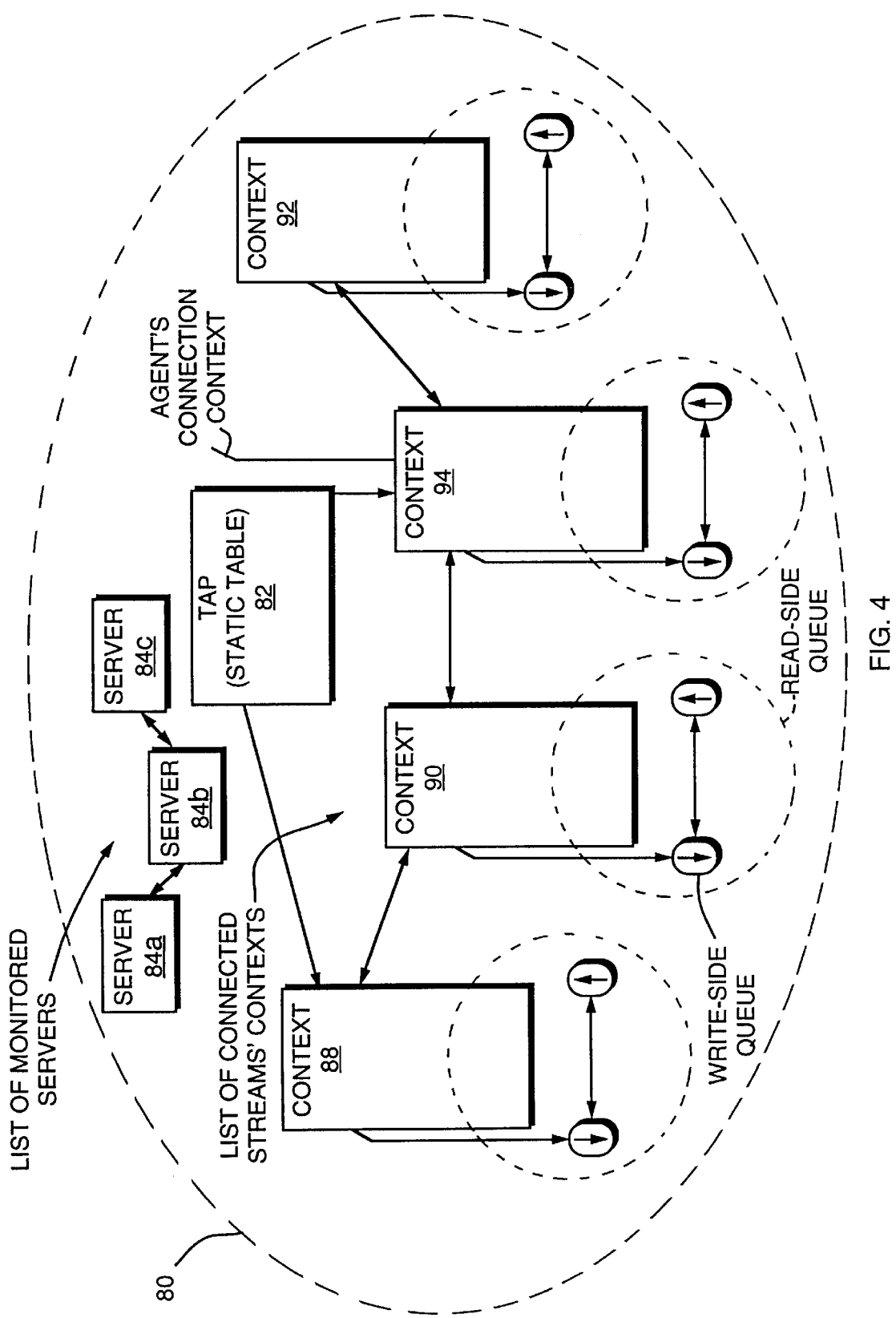
FIG. 4 is a detailed illustration of the operational details of a module.

FIG. 4 is a detailed illustration of operational details of the module 80 (as shown in FIG. 3) on the SUN SOLARIS™ platform. The module 80 maintains a list 84 of the servers to be monitored. In one embodiment, the list of servers is provided to the module 80 by the agent 50, which can receive the list from the MUM console 42. All inbound and outbound traffic on connections to the listed servers is passed by module 80 to the agent 50.

In operation, for each connected stream, the module 80 creates a context data structure for storing information. The context is then linked, as shown, to the corresponding STREAMS queues, read and write. The context stores information about the connected stream that describes the type of connection. The module 80 also opens a context data structure 94 for communicating to the agent 50. The module 80 can store data about event details within this context 94, and the agent 50 can read the data out, and pass the information to the correlation processor 64. The tap table 82 stores a list of the connected streams context data structures, the list of all servers being monitored, and the context data structure for communicating with the agent 50.

Each time a connection is established the module creates a context. The module then determines the server address for the connection by generating a sequence of M_IOCTL requests that are sent downstream. Response from the TCP stack is captured and prevented from being sent upstream, and the server IP address is resolved. If the address matches one of the addresses in the list 84, the connection is marked as being monitored, and the module 80 begins monitoring. During monitoring, copies of all traffic sent or received under the context of a monitored connection is passed to the upstream queue of the agent communication context 94, for being passed upstream to the agent 50. In this way the agent 50 receives copies of all traffic for any connection to any of the selected servers.

The information passed upstream by module 80 to the agent 50 is sent to the event correlation processor 58. The event correlation processor is a software module that can process event detail information to determine certain transaction level information. For example, the module 80 can pass a SYBASE logon request to the agent 50. The event correlation processor can receive the logon request and monitor the connection until a logon acknowledge is sent by the SYBASE server. By comparing the time difference between these two events, the event correlation processor 58 can determine a measure of the response time of the distributed process. Other similar metrics that can also be generated to provide end-to-end level analysis of system performance.

Figure 5:
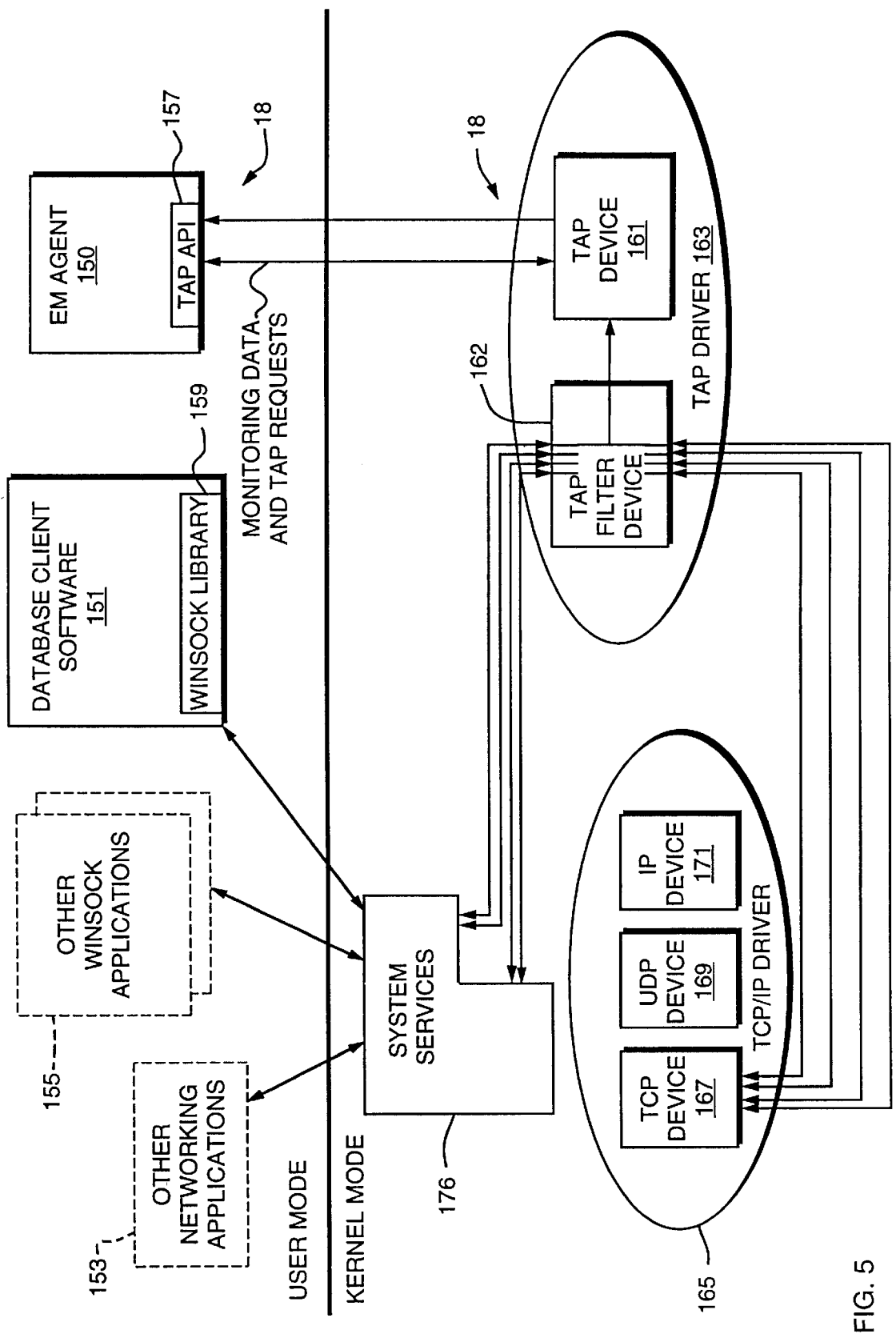
FIG. 5 depicts another example of a Module for collecting details of a distributed process.

FIG. 5 depicts another example of a module 180 for collecting details of a distributed process, and suitable for use on a WINDOWS NT™ platform. The module 180 employs a different architecture than the module 80, but performs the same functions. That is, the module 180 can enable monitoring by the agent 150 of the local client's database software 151 or other distributed process applications 153, 155 having traffic that passes via system services 176 through the TCP stack of the managed node.

The module 180 includes an agent 150 and a TAP driver 163. The agent 150 includes a TAP API 157, and the TAP driver 163 includes a Tap device 161 and a TapFilter device 162. The Tap device 161 communicates with the TAP API 157 to set up monitoring parameters and to supply monitoring data. The TapFilter device 162 attaches on top of the TCP device 167 of the TCP/IP driver 165 to monitor all TCP traffic in and out of the managed node. The TapFilter device 162 uses a feature of the Windows NT™ driver layering architecture to attach itself to the TCP device 167. In particular, the TapFilter device 162 uses an operating system call (i.e., IoAttachDevice) to insert itself into the data stream for the TCP device. Thus, any data to or from the TCP device passes transparently through the TapFilter device 162. The System Services 176, the TAP driver 163, and the TCP/IP driver may execute in kernel mode, as shown in FIG. 5.

The TCP/IP driver 165 also includes a UDP device 169 and an IP device 171 that support other sub-protocols in the TCP/IP family of protocols. Although not shown, the TapFilter device 162 could attach on top of the UDP device 169 and/or the IP device 171 to monitor all data traffic for such devices.

It will be understood that the depicted modules 80 and 180 are only illustrative embodiments of a module for interfacing to the network communication stack. Other modules can be practiced with the invention. For example, referring again to FIG. 1, it can be seen that different types of workstations are depicted in system 10 to show that system 10 is a distributed system having heterogeneous operating environments. The workstations can be of different architectures, both hardware and software, and the servers 20 and 22 can similarly be of different hardware or software architecture. For example, the workstation 12 can be a SUN workstation having a module as depicted in FIG. 2. Moreover, the network system that interconnects the workstations and the servers can be a local area network, a wide area network, a metropolitan area network, or a combination of either. The point is that in a distributed computing architecture the processing that occurs to implement a particular service, whether it is e-mail, a database, a word processing program, or any other service or computer applications, it is distributed across multiple processors that are somehow interconnected for exchanging data.

It will thus be seen that the invention efficiently achieves the objects set forth above. Moreover, it will be understood that various substitutions, additions and modifications can be made to the invention without departing therefrom and that embodiments depicted and described are merely illustrative of the invention and are not to be read in a limiting sense; with the scope of the invention defined by the following claims to the fullest extent allowed by the terms therein.

We claim:

1. A system for monitoring a server program operating on a network, the system comprising:
    a client having a communication stack for passing application data between said network and said client;
    an interface running in an operating system kernel for coupling into said communications stack and for monitoring said application data being passed between said client and said network;
    a filter module for processing said application data to detect portions of said application data representative of communications associated with said server program; and
    a data memory for storing said detected portions of said application data.

2. A system according to claim 1, further comprising:
    an agent for coupling said data memory and for processing said detected portions of said application data to generate information representative of an operation of said server program.

3. A system according to claim 2, further comprising
    a user module for receiving said information from said agent, and for processing said information to determine a characteristic of said server program operation.

4. A system according to claim 3, wherein said user module includes
    a usage detector for processing said information to determine a characteristic representative of a volume of use of said server program by said client.

5. A system according to claim 3, wherein said user module includes
    an error detector for processing said information to determine a characteristic representative of a transmission error occurring in a transmission between said server program and said client.

6. A system according to claim 3, wherein said user module includes
    a response detector for processing said information to determine a characteristic representative of a response time for a service provided by said server program.

7. A system according to claim 3 wherein said user module includes
    an audit processor for auditing transactions between said server program and said client.

8. A system according to claim 3 wherein said user module includes
    a security processor for processing said information to identify a security characteristic representative of a level of security.

9. A system according to claim 1, further comprising
    a control module for providing a list of a plurality of server programs and for generating a plurality of said filter modules, each associated with a respective one of said plurality of server programs.

10. A system according to claim 1, further comprising
    a console module, for providing control over operation of said monitor.

11. A system for monitoring operation of a server program executing on a server connected to a network, the system comprising:
    a plurality of clients, each capable of requesting service of said server program, and each having a communications stack for exchanging application data with said network;
    an interface running in an operating system kernel for coupling into said communications stack and for monitoring said application data being passed between said client and said network;
    a filter module for processing said application data to detect portions of said application data representative of communications associated with said server program; and a data memory for storing said detected portions of said application data.

12. A system according to claim 11, wherein the interface for coupling into said communications stack monitors loop back application data that passes through said communications stack without going out onto the network.

13. A method for monitoring a server program operating on a network, the method comprising:

providing a client having a communications stack for passing application data between said network and said client:

monitoring said application data being passed between said client and said network via a monitor having an interface running in an operating system kernel for coupling into said communications stack;

filtering said monitored application data to detect portions of said application data representative of communications associated with said server program; and storing said detected portions of said application data in a data memory.

14. A method according to claim 13, further comprising:

coupling to said data memory via an agent; and processing in said agent said detected portions of said application data to generate information representative of an operation of said server program.

15. A method according to claim 14, further comprising:

processing said information to determine a characteristic of said operation.

16. A method, according to claim 13, wherein monitoring said application data includes accessing said communications stack at a TCP layer.

17. A method, according to claim 13, wherein monitoring said application data includes accessing said communications stack at a transport layer.

* * * * *